T. & T. F. Walker.
Bathometer.
Nº 76,361.    Patented Apr. 7, 1868.

Witnesses
George Shaw
Richard Sherrett

Inventor
Thomas Walker
Thomas Ferdinand Walker

United States Patent Office.

THOMAS WALKER AND THOMAS FERDINAND WALKER, OF BIRMINGHAM, ENGLAND.

Letters Patent No. 76,361, dated April 7, 1868; patented in England, December 20, 1866.

IMPROVEMENT IN APPARATUS FOR TAKING SOUNDINGS.

The Schedule referred to in these Letters Patent and making part of the same.

TO ALL TO WHOM IT MAY CONCERN:

Be it known that we, THOMAS WALKER and THOMAS FERDINAND WALKER, of Oxford street, Birmingham, in the county of Warwick, England, engineers, subjects of the Queen of Great Britain, have invented or discovered new and useful "Improvements in Means or Apparatus for Taking Soundings;" and we do hereby declare that the following is a full and exact description thereof, reference being had to the accompanying drawings, and to the letters of reference marked thereon.

Before using sounding-machines for the purpose of taking deep-water soundings, it is desirable to turn the indicating-wheels so that one of the figures thereon may be definitely opposite a fixed pointer, in order to ascertain correctly, after taking a sounding, the depth of such sounding by the extent of motion which has been given to such wheels; and it is usual to move such wheels round, so that the pointers may point to the highest figures thereon as a starting-point. The adjustment for this purpose is ordinarily obtained by lifting the locking-lever, and then moving the wheel-work to the starting-point determined upon by turning the vane-spindle, an operation which is tedious in itself, and involves loss of time to perform it.

In the specification of Letters Patent granted to me, the said THOMAS WALKER, in England, and bearing date the 13th of December, 1861, No. 313, I described a method which partially remedied this evil, by forming the figures of one of the wheels on a separate plate, which is borne by spring-pressure to its wheel, so as to give it a tendency, by the friction obtained, to move with that wheel. By turning this plate on its wheel, the adjustment of the figures to the pointer for that wheel is obtained. The other indicating-wheel (when a secondary indicating-wheel was used) had still to be turned by the motion of the vane-spindle, as heretofore.

Our present improvements consist in setting both indicating-wheels at the same time, and in affording facility for setting the wheel-work for use, and then, after use, ascertaining the extent of motion obtained thereto without necessarily looking at the instrument.

For this purpose there is a plate connected to one of the indicating-wheels, to move with it by spring-pressure, and the spindle of this plate carries a pinion, the teeth of which take into the teeth of the other indicating-wheels. This spring-plate is, as in the specification referred to, capable of being moved by simply overcoming the frictional pressure applied to it without turning its wheel, and it is notched at its edge opposite the figures thereon, and is provided with a notch or stop to act with a spring-click, so that in turning it, its position for setting or starting, and then, after use, the distance of ration from such starting-point, may be ascertained without the necessity of looking at the indications by turning the stop to the click, and then, after use, feeling the number of notches from such stop on the wheel to the starting-point.

But that the invention may be fully understood, we will, by the aid of the accompanying drawings, proceed to describe means pursued by us in carrying the same into effect.

Description of the Drawings.

In each of the views the same letters are employed to indicate corresponding parts wherever they occur.

Figure 1:
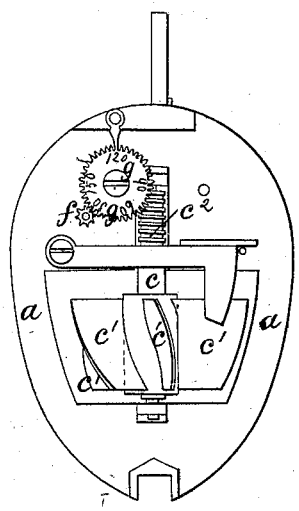
Figures 1 and 2 show two opposite side views.
Figure 2:
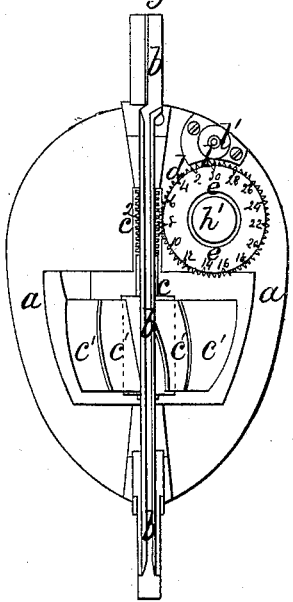
Figure 3:
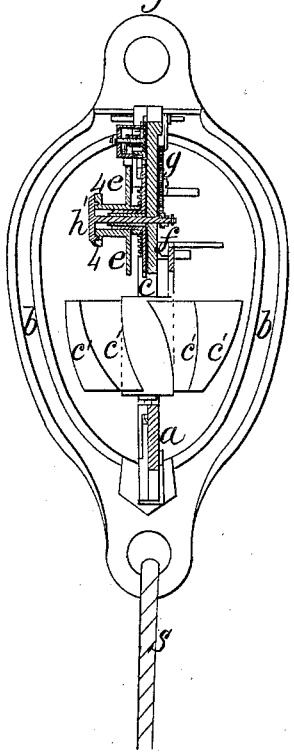
Figure 3 an edge view, partly in section, of apparatus for taking soundings, with our improvements applied to it.
Figure 5:
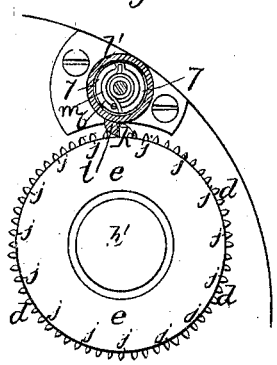
Figures 5 and 6 show some of the parts on a larger scale.
Figure 6:
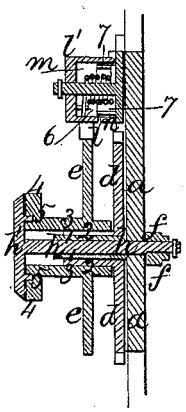
Figure 4:
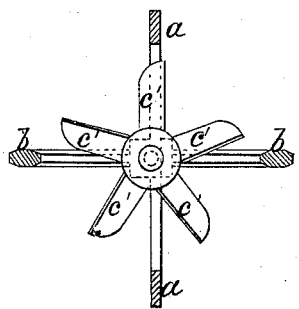
Figure 4 is a horizontal section through the same.

$a\ a$ is the main framing carrying the various parts. $b\ b$ is the protector or guard over the vanes $c^1$ of the spindle $c$, but which protector $b$ is removed in fig. 1. Upon the spindle $c$ is formed the thread $c^2$, which takes into the teeth of the wheel $d$, to cause the rotation of that wheel on its axis as the spindle $c$ is caused to revolve by the action of the water on the vanes $c^1$ as the apparatus descends through the water. This wheel $d$ is the first indicating-wheel; but, according to the specification of the former patent, above referred to, the figures, in place of being applied to the face of the wheel, are applied to a separate plate, $e$, capable of being moved thereon, and retained to the wheel $d$ by spring-pressure.

According to our present improvements, a spindle from the plate $e$ carries a pinion, $f$, so that the plate $e$ and pinion $f$ may move together, and the teeth of the pinion $f$ gear with the teeth of the second indicating-wheel, $g$, so that any movement of the plate $e$ on its axis effects simultaneously a rotative movement of the second indicating-wheel $g$. According to arrangement shown, this is effected in the following manner: The wheel $d$ revolves on a hollow stem, 1, affixed to or forming part of the frame $a$; and at this part the wheel $d$ is formed with a projecting neck, 2, adapted to receive the hollow neck, 3, of the plate $e$. The neck 2 of the wheel $d$ is split, and the ends of the split parts are formed with a tendency to spring outwards, and thereby exert friction to retain the plate $e$ from freely revolving without the wheel $d$, except when pressure is exerted to overcome the force of the spring-ends of the neck 2. The plate $e$ is capable of being thus turned independently of the wheel $d$, by acting on the projecting rim 4 thereof, which I prefer to be milled. A spindle, $h$, is formed with a head, $h'$, at one end, and this head is provided with pins, 5 5, which pass into recesses formed for them in the rim 4, so that the plate $e$ and spindle $h$ may rotate together. The spindle $h$ passes through the hollow stud 1, and at its other end receives the pinion $f$, which is there fixed by a pin passed through it and the spindle $h$. $jj$ represent notches in edge of the plate $e$, opposite the respective figures on the plate, and $k$ is a stop applied to the edge of the plate $e$, to act, in the revolution of that plate, against the projection $l$ from the cylinder $l^1$, which is acted on internally by the coiled spring $m$, one end of which rests against a pin, 6, standing out from the cylinder $l'$, whilst the other end acts in a notch in the neck 7 from the frame $a$. $n$ is a stud from the frame $a$, acting in a notch in the cylinder $l'$, so as to regulate its motion. The projection $l$ thereby acts as a spring-click, to admit of the passing of the projection or stop $k$ on the plate $e$, with the movement of that plate in one direction, and to prevent its passing in the opposite direction, and thereby indicating the starting-point.

According to arrangements of deep-water sounding-machines hitherto generally in use, the weight used to aid the descent of such sounding-machines through the water is attached close up to and immediately under the lower part of such machines; and we find that by such arrangement the "wake" of the weight in such position materially interferes with the correct registering of the machine, and this evil is remedied by applying a rope or other connection, of some considerable length, between the weight and the machine, when supporting such weight directly under the machine. We also find that it is important to have the length of this connection between the weight and the machine not less than two feet, though we do not confine ourselves to this length; and we find it convenient to employ for this purpose a rope, with its two ends connected together, so as to form an endless rope, or with a loop at each end of it, and to connect the parts by looping.

Having thus described our improvements, and means which we adopt in carrying the same into effect, we would have it understood that we do not confine ourselves to the precise arrangements of parts shown and described, as these may be varied without departing from the peculiar character of the invention; but

What we claim, is—

1. The combination and arrangement of the disk-plate $e$, provided with numbers to correspond with the movements of one of the indicating-wheels, and connected by spring-pressure, so as to move with such wheel, when geared to give motion to another indicating-wheel, so that any movement given to said plate may simultaneously effect the corresponding movement of such other indicating-wheel, substantially as set forth.

2. The application of the spring-click $l$ and stop $k$ to the disk-plate $e$, to indicate the point of starting, substantially as shown and described.

3. The application of the notches $jj$, or equivalent, in combination with the stop $k$, to the disk-plate $e$, in order that the distance of its partial rotation may be ascertained by feeling the same after use, substantially as set forth.

4. We also claim the application of a rope, $s$, or equivalent connection, between the sounding-machine and the weight used to aid the descent of such machine, for preventing the action of the indicating-devices from being impeded by the "wake" of such weight, as set forth.

THOS. WALKER. [L. S.]
THOMAS FERDINAND WALKER. [L. S.]

Witnesses:
GEORGE SHAW, *Cannon Street, Birmingham.*
RICHARD SKERRETT, *Cannon Street, Birmingham.*